No. 744,840. PATENTED NOV. 24, 1903.
J. F. WHEELER & A. BOICE.
CLOVER BUNCHER.
APPLICATION FILED APR. 11, 1902.
NO MODEL. 2 SHEETS—SHEET 1.
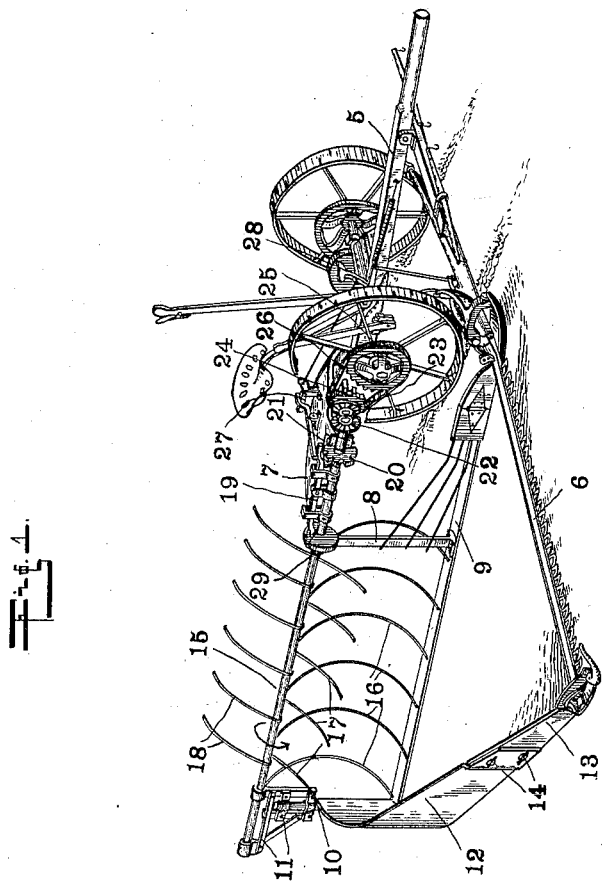
WITNESSES:
INVENTORS
James F. Wheeler
Augustin. Boice
BY
Bradford & Hood
ATTORNEYS

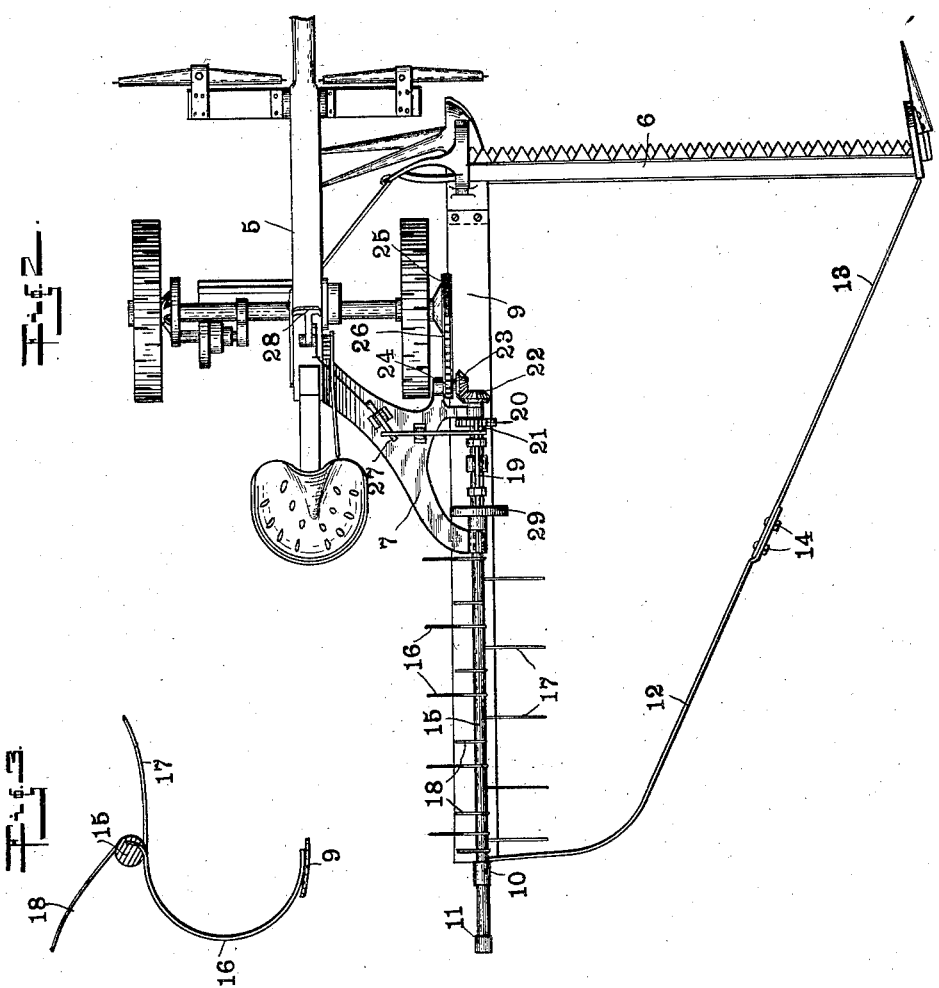

No. 744,840.  Patented November 24, 1903.

UNITED STATES PATENT OFFICE.

JAMES F. WHEELER, OF PERRY TOWNSHIP, MARION COUNTY, AND AUGUSTIN BOICE, OF INDIANAPOLIS, INDIANA.

CLOVER-BUNCHER.

SPECIFICATION forming part of Letters Patent No. 744,840, dated November 24, 1903.

Application filed April 11, 1902. Serial No. 102,345. (No model.)

*To all whom it may concern:*

Be it known that we, JAMES F. WHEELER, residing in Perry township, and AUGUSTIN BOICE, residing at Indianapolis, in the county of Marion and State of Indiana, citizens of the United States, have invented certain new and useful Improvements in Clover-Bunchers, of which the following is a specification.

The object of our invention is to produce an attachment for mowing-machines by means of which low crops, such as clover and the like, may be bunched and discharged, transversely of the line of movement of the machine, to the rear of the machine, so as to leave a path immediately next the standing crop of sufficient width to allow for the passage of the machine during the next cut without disturbing the cut and bunched crop.

The accompanying drawings illustrate our invention.

Figure 1 is a perspective view of our device attached to a mowing-machine of standard make. Fig. 2 is a plan and Fig. 3 a sectional detail view.

In the drawings, 5 indicates a mowing-machine having the usual cutter-bar 6. Extending from the rear of the machine-frame is a supporting-arm 7, part of which consists of an upright 8, to the lower end of which is secured a shoe 9, which extends parallel to the line of movement of the machine and at its forward end is adapted to be secured to the heel of the cutter-bar 6. Swiveled upon a vertical axis at the rear end of the shoe 9 is a post 10, the upper end of which is swiveled in a bearing-bracket 11. Post 10 carries a guard 12, the forward end of which consists of an extension 13, which is longitudinally adjustable upon the portion 12 by suitable bolts 14. The forward end of portion 13 is adapted to be secured to the toe of the cutter-bar 6, and the arrangement is such that the bar 12 13 lies at an acute angle to the cutter-bar and extends from the toe thereof to the post 10. Pivoted in suitable bearings on the supporting-arm 7 and the bearing-bracket 11 is a rake-bar 15, provided with gathering-teeth 16, packer-teeth 17, and ejector-teeth 18, the construction being similar to that shown in Patent No. 626,471, issued to James F. Wheeler. Shaft 15 has pivoted thereto at its forward end a clutch-lever 19, which is adapted to be thrown into engagement with a clutch 20, carried by a short shaft 21, also mounted on arms 7 in alinement with shaft 15. Shaft 21 carries a bevel-gear 22, which meshes with a similar gear 23, the gear 23 carrying a sprocket-wheel 24, which is connected to the driving-sprocket 25 by means of a suitable chain 26. Arm 19 may be thrown into engagement with clutch 20 by means of a lever 27, operated by a foot-lever 28. Clutch-lever 19 in construction and arrangement is similar to the clutch-lever 34 found in Patent No. 693,093, issued to us, and when thrown into engagement with the clutch 20 is held into engagement therewith during a complete revolution of the rake-bar 15 by means of a cam 29, as in the patent mentioned. Shoe 9 is slightly curved, as shown in Fig. 3, and forms a support for the rear end of shaft 15, as well as a protection for the teeth 16 of the rake-bar.

In operation the clutch-lever 20 is continuously rotated by the forward movement of the machine, and the crop which is cut by the cutter-bar falls upon the ground to the rear of the cutter-bar and by means of the inclined guard 12 13 is forced over toward the machine and into the gathering-teeth 16, being detained thereby and carried along with the machine. When a sufficient quantity of cut crop has been gathered by the rake-bar to form a bunch, the operator by pressing upon the foot-lever 28 throws clutch-lever 19 into engagement with the continuously-moving clutch member 20, so as to cause rake-bar 15 to rotate, the said rake-bar being given a complete rotation and coming to rest at its initial position by reason of the action of the cam 29. The action of the rake-bar discharges the bunch of cut crop transversely from the machine, so as to thus leave a track of sufficient width for the passage of the machine, said track being entirely free from cut crop.

We claim as our invention—

1. A buncher attachment for mowing-machines, consisting of a rotatable rake-bar, means for supporting said rake-bar at an angle to the cutter-bar, an inclined guard adapted to extend from the toe of the cutter-bar to the rear end of the rake-bar, and means for operating the rake-bar to intermittently discharge the cut crop transversely of the line of movement of the machine.

2. A buncher attachment for mowing-machines consisting of a shoe provided at its forward end with means to be secured to the heel of a cutter-bar of a mowing-machine, suitable standards and bearings carried by said shoe, a rake-bar mounted in said bearings, means for connecting one of said bearings to the main frame of the mowing-machine, and an inclined guard extending diagonally forward from the rear end of the shoe, for the purpose set forth.

3. The combination, with a mowing-machine, of a rotatable rake-bar carried thereby substantially at right angles to the cutter-bar to the rear of the heel thereof, an inclined guard connecting the toe of the cutter-bar with the rear end of the rake-bar, and means for operating said rake-bar.

4. The combination, with a mowing-machine, of a rotatable rake-bar carried thereby substantially at right angles to the cutter-bar to the rear of the heel thereof, an inclined guard connecting the toe of the cutter-bar with the rear end of the rake-bar, means for operating the rake-bar, and a shoe connecting the rear end of the guard with the machine and arranged to ride upon the ground beneath the point of the gathering-teeth of the rake-bar, substantially as and for the purpose set forth.

In witness whereof we have hereunto set our hands and seals, at Indianapolis, Indiana, this 5th day of April, A. D. 1902.

JAMES F. WHEELER. [L. S.]
AUGUSTIN BOICE. [L. S.]

Witnesses:
ARTHUR M. HOOD,
JAMES A. WALSH.